Aug. 22, 1961  L. T. KNOCKE  2,996,735
METHOD FOR SECURING A PLATED WASHER TO A PLATED
NUT OR BOLT BY FUSING THE PLATINGS
Filed Dec. 23, 1957
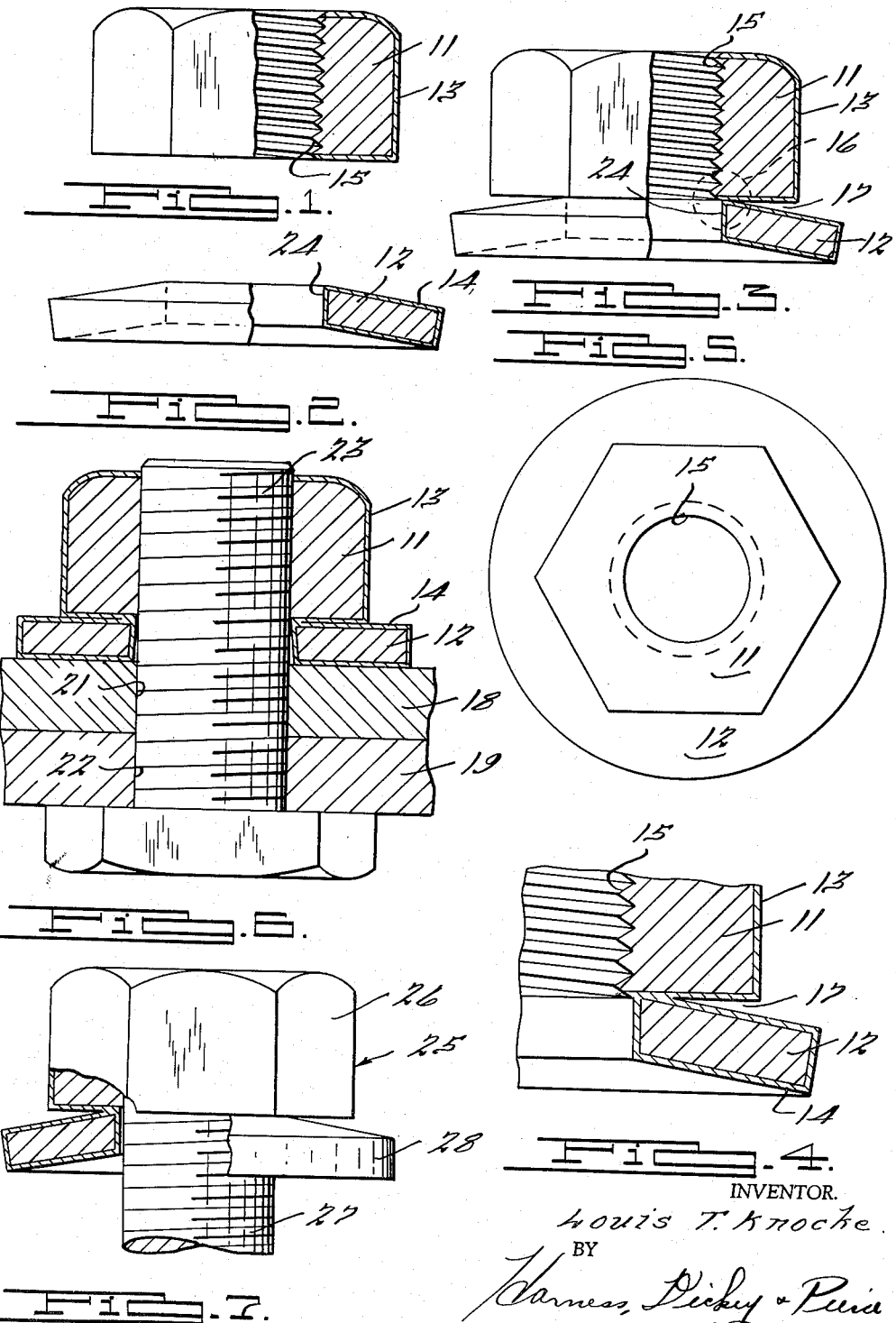
INVENTOR.
Louis T. Knocke.
BY
Harness, Dickey & Pierce
ATTORNEYS.

United States Patent Office 2,996,735
Patented Aug. 22, 1961

2,996,735
METHOD FOR SECURING A PLATED WASHER TO A PLATED NUT OR BOLT BY FUSING THE PLATINGS
Louis T. Knocke, 5578 Putnam, Birmingham, Mich.
Filed Dec. 23, 1957, Ser. No. 704,820
2 Claims. (Cl. 10—10)

This invention relates to self-locking fasteners, and more particularly to a method of manufacturing nuts or bolts incorporating portions which engage the work when the fastener is tightened to prevent loosening by a reduction in gripping force and later rotation of the fastener.

It is an object of the invention to provide an improved method for self-locking fasteners which eliminates the necessity of separately handling coned type lock washers which are now in widespread use in conjunction with nuts or bolts.

It is another object to provide an improved method of this nature which permits the use of a coned lock washer having an inside diameter very close to the major thread diameter of the nut or bolt, thus insuring maximum contact between the parts, improving the locking effect, and permitting the use of a washer having a smaller outside diameter.

It is a further object to provide an improved method of this type which may be carried out without affecting the hardness or springlike qualities of the washer and will permit economy in the amount of metal used for the nut or bolt.

Other objects, features, and advantages of the present invention will become apparent from the subsequent description, taken in conjunction with the accompanying drawings.

In the drawings:

FIGURE 1 is an elevational view, partly in cross section, of a nut which has been plated in accordance with the principles of the invention;

FIGURE 2 is a side elevational view, partly in cross section, of a coned washer which has been likewise plated in accordance with the principles of the invention;

FIGURE 3 is an elevational view, partly in cross section, of the assembled nut and washer after they have been fused together;

FIGURE 4 is an enlarged fragmentary view of a portion of the assembly shown in FIGURE 3, with the nature of the fused portion more clearly visible;

FIGURE 5 is a top plan view of the assembly shown in FIGURE 3;

FIGURE 6 is a cross-sectional view in elevation of the combined nut and washer applied to a bolt for fastening two workpieces; and FIGURE 7 is a view of a modified form of the invention consisting of a combined bolt and washer.

In general terms, the invention comprises a construction and method of assembling a conventional coned lock washer and a nut or bolt by first plating the separate parts with a coating of a suitable material, and then fusing together the parts by means of heat applied while they are held together. The resulting construction may be handled and applied to the work as a unit, without the necessity of separately applying the washer and then the nut or bolt.

As seen in FIGURES 1 and 2, in carrying out the method of this invention, a conventional nut 11 and a conventional coned washer 12 are plated with a thin coating of a material suitable for fusing the two parts together. This coating is indicated at 13 on nut 11 and at 14 on washer 12. The material used may be cadmium, zinc, copper or mixtures of these or other materials which are found suitable for the purpose. The internal thread 15 of nut 11 may be uncoated if desired, the actual coating process being accomplished by any conventional means.

After parts 11 and 12 have been coated, they are held together, and the zone of contact indicated by the dotted circle 16 in FIGURE 3 is subjected to a controlled heat which is just sufficient to melt the coatings in the annular area of contact so as to fuse the parts together, as shown in FIGURE 4. Any suitable method, such as momentary electrical current transfer, may be utilized to create this localized annular zone of heating. The heat is preferably applied in a manner which will not affect the characteristics of the washer metal which contribute to its springlike qualities. It should be observed that the space 17 which exists between the coned washer 12 and nut 11 will still remain open, thus permitting the washer to be flattened in the usual manner.

FIGURE 6 shows the assembled washer and nut applied to a pair of workpieces 18 and 19 having apertures 21 and 22, respectively, through which passes a bolt 23. The initial assembly of washer 12 and nut 11 on bolt 23 will of course be facilitated by the fact that the washer and nut are fused together, thus making it only necessary to handle one unit. Nut 11 is threaded on the bolt and tightened, causing washer 12 to become flattened between workpiece 19 and nut 11. Flattening of washer 12 will cause it to coact with the nut and workpiece by frictionally locking the parts together, thus preventing them from becoming loosened by rotation.

It may be pointed out that it is not critical whether the fused bond between nut 11 and washer 12 in area 16 remains intact throughout the tightening process, since its main purpose will have been accomplished by facilitating handling and insuring proper end-to-end orientation of the washer with respect to the nut and work. Since washer 12 is assured of concentricity with respect to the nut, its inner diameter 24 during manufacture may be made quite close to the major shank or thread diameter on bolt 23, thus providing maximum areas of contact between the parts. The fact that a relatively small inside diameter may be used for the washer will also permit the use of a relatively small outside diameter, thus conserving space which may be particularly needed in tight quarters.

Should it be necessary to remove the parts at any time, nut 11 and washer 12 will still be useful in other applications after they have been removed from a first application to work. This will be so even though the fusion between the nut and washer may not be completely intact, since the shapes of these parts will still be undistorted.

FIGURE 7 shows another form of the invention which is generally similar to that of the previous figures but which uses a bolt instead of a nut. The bolt is generally indicated at 25 and comprises a head 26 and a threaded shank 27. Washer 28 is of the usual form, and both the bolt and washer are initially plated with a coating of material as described above. Washer 28 may then be slipped over shank 27 of bolt 25, and the parts heated locally while they are held together as shown in FIGURE 6, fusing the plating of the two parts. The result will be a bolt which has a pre-assembled coned lock washer capable of being flattened in the usual manner when the bolt is tightened, thus preventing the bolt from rotating due to a reduction in the gripping force. As in the previous embodiment, the parts may later be disassembled for use elsewhere.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. In a method for preassembling a threaded fastener having a flat external surface and a coned lock washer, the steps of plating the entire external surfaces of the fastener and lock washer with a thin coating of fusible material, holding the fastener and lock washer together in the undeformed position which they will have when initially applied to the work with said flat surface engaging an edge of said washer so as to provide a relatively small annular area of contact, and causing a momentary electrical current transfer between said fastener and lock washer and through said area to heat and fuse together the coatings in said area without affecting the characteristics of the fastener and washer metal.

2. In a method for preassembling a threaded bolt the head of which has a flat undersurface and a coned lock washer, the steps of plating the entire external surface of the bolt head and of the lock washer with a thin coating of fusible material, holding the bolt and lock washer together in the undeformed position which they will have when initially applied to the work with said flat undersurface engaging an edge of said washer so as to provide a relatively small annular area of contact, and causing a momentary electrical current transfer between said bolt and lock washer and through said area to heat and fuse together the coatings in said area without affecting the characteristic of the bolt and washer metal.

References Cited in the file of this patent

UNITED STATES PATENTS

| | | |
|---|---|---|
| 1,874,462 | Crowther | Aug. 30, 1932 |
| 1,921,247 | Walker | Aug. 8, 1933 |
| 1,945,005 | Vacher | Jan. 30, 1934 |
| 1,988,926 | Thomson | Jan. 22, 1935 |
| 2,155,274 | Kenah | Apr. 18, 1939 |
| 2,444,833 | Lampert | July 6, 1948 |

FOREIGN PATENTS

| | | |
|---|---|---|
| 721,806 | France | Dec. 23, 1931 |